(12) United States Patent
Maruyama (10) Patent No.: US 8,712,674 B2
(45) Date of Patent: Apr. 29, 2014

(54) VEHICLE RUNNING CONTROL SYSTEM (75) Inventor: Tasuku Maruyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 995 days.

(21) Appl. No.: 12/339,149

(22) Filed: Dec. 19, 2008

(65) Prior Publication Data

US 2009/0164109 A1 Jun. 25, 2009

(30) Foreign Application Priority Data

Dec. 21, 2007 (JP) .................................. 2007-330764

(51) Int. Cl.
| | |
|---|---|
| B60T 8/32 | (2006.01) |
| G05D 1/00 | (2006.01) |
| G06F 7/00 | (2006.01) |
| G06F 17/00 | (2006.01) |
| B60T 7/12 | (2006.01) |
| G06F 19/00 | (2011.01) |
| G06G 7/70 | (2006.01) |
| G06G 7/76 | (2006.01) |
| G08G 1/00 | (2006.01) |

(52) U.S. Cl.
USPC ................................ 701/116; 701/93; 701/96

(58) Field of Classification Search
USPC .......... 701/1, 93, 96, 116, 117, 301; 340/435, 340/436, 903
See application file for complete search history.

(56) References Cited

U.S. PATENT DOCUMENTS

| | | | | | |
|---|---|---|---|---|---|
| 5,529,139 | A | * | 6/1996 | Kurahashi et al. ............ | 180/169 |
| 5,808,561 | A | * | 9/1998 | Kinoshita et al. ............. | 340/903 |
| 5,850,176 | A | * | 12/1998 | Kinoshita et al. ............. | 340/435 |
| 6,269,298 | B1 | * | 7/2001 | Seto ................................ | 701/96 |
| 6,298,298 | B1 | * | 10/2001 | Tange et al. ...................... | 701/96 |
| 6,459,991 | B1 | * | 10/2002 | Takiguchi et al. ............. | 701/301 |
| 6,826,479 | B2 | * | 11/2004 | Miyahara ...................... | 701/301 |
| 7,257,478 | B2 | * | 8/2007 | Sugano ........................... | 701/96 |
| 7,668,638 | B2 | * | 2/2010 | Saeki .............................. | 701/96 |
| 7,756,640 | B2 | * | 7/2010 | Ueyama et al. ............... | 701/221 |
| 2002/0055808 | A1 | * | 5/2002 | Matsumoto ...................... | 701/1 |
| 2002/0087255 | A1 | * | 7/2002 | Jindo et al. ...................... | 701/96 |
| 2004/0023755 | A1 | * | 2/2004 | Nozaki .............................. | 477/45 |
| 2005/0090950 | A1 | * | 4/2005 | Sawamoto et al. ............. | 701/23 |
| 2008/0077283 | A1 | * | 3/2008 | Ueyama et al. .................... | 701/1 |
| 2008/0078600 | A1 | * | 4/2008 | Inoue et al. ................... | 180/170 |
| 2008/0109120 | A1 | * | 5/2008 | Sawamoto ........................ | 701/1 |
| 2009/0204304 | A1 | * | 8/2009 | Urban et al. .................... | 701/96 |

FOREIGN PATENT DOCUMENTS

JP 2000-057499 8/1998

* cited by examiner

*Primary Examiner* — Khoi Tran
*Assistant Examiner* — Nicholas Kiswanto
(74) *Attorney, Agent, or Firm* — Smith, Gambrell & Russell, LLP.

(57) ABSTRACT

At least a follow-up target inter-vehicle distance is set on the basis of information about a preceding vehicle recognized by a forward-environment recognition device mounted in a subject vehicle and including a stereo camera, and it is determined whether or not the preceding vehicle is making a right/left turn. When a right/left turn of the preceding vehicle is detected, the follow-up target inter-vehicle distance is multiplied by a correction coefficient so as to set a different follow-up target inter-vehicle distance for the right/left turn.

5 Claims, 5 Drawing Sheets

VEHICLE RUNNING CONTROL SYSTEM

CROSS REFERENCE TO RELATED APPLICATIONS

The disclosure of Japanese Patent Application No. 2007-330764 filed on Dec. 21, 2007 including the specification, drawings and abstract is incorporated herein by reference in its entirety.

BACKGROUND OF THE INVENTION

1. Field of the Invention

The present invention relates to a vehicle running control system that sets a target inter-vehicle distance to a preceding vehicle to be shorter when the preceding vehicle is turning to the right or left than when the preceding vehicle is traveling straight ahead.

2. Description of the Related Art

Various running control systems have been proposed in which a traveling environment in front of a subject vehicle, such as a car, is detected by a front-environment recognition device mounted in the subject vehicle and includes a camera, a millimeter-wave radar, a laser radar, or the like and in which running of the subject vehicle is controlled on the basis of the detected traveling environment. In these running control systems, when a preceding vehicle, which is traveling ahead of the subject vehicle, is recognized as being in front of the vehicle by the front-environment recognition device, a target inter-vehicle distance is set on the basis of the speed of the subject vehicle or the preceding vehicle, and follow-up running control is performed while maintaining the target inter-vehicle distance. In contrast, when no preceding vehicle is recognized as being in front of the subject vehicle, constant-speed running control is performed at a vehicle speed set by the driver beforehand (set vehicle speed).

In follow-up running control, when the preceding vehicle brakes and decelerates, the inter-vehicle distance between the subject vehicle and the preceding vehicle becomes shorter than the target inter-vehicle distance. Therefore, the subject vehicle is also decelerated by brake control so that the actual inter-vehicle distance returns to the target inter-vehicle distance. Hence, when the preceding vehicle is decelerated prior to making a right or left turn (hereinafter referred to as a right/left turn), the subject vehicle is also decelerated. After the preceding vehicle moves out of a traveling lane of the subject vehicle at a later time, the subject vehicle is accelerated.

The moving speed of the preceding vehicle, which is detected by the subject vehicle when the preceding vehicle is making a right/left turn, is determined from the vector in the straight traveling direction of the subject vehicle. Therefore, the moving speed is lower than the speed in the traveling direction of the preceding vehicle. For this reason, in a running control system that performs brake control according to the inter-vehicle distance and the relative speed, even when the preceding vehicle is making a right/left turn, the target inter-vehicle distance is set on the basis of the vehicle speed detected in the vector in the traveling direction of the subject vehicle. When the actual inter-vehicle distance becomes shorter than the target inter-vehicle distance, brake control is carried out.

Accordingly, when the preceding vehicle makes a right/left turn during conventional follow-up running control, braking is performed earlier than the driver recognizes the right/left turn of the preceding vehicle and presses the brake pedal. Further, when the subject vehicle comes close to the preceding vehicle during conventional follow-up running control, an excessive brake force is applied.

In general, when the driver recognizes a preceding vehicle making a right/left turn, the driver estimates the time at which the preceding vehicle will move out of the traveling lane of the subject vehicle, performs braking in accordance with the time, and tries to pass the preceding vehicle while reducing the speed of the subject vehicle to a predetermined speed.

In contrast, in the above-described brake control method of the related art, the speed of the preceding vehicle that is traveling straight ahead and the speed of the preceding vehicle detected as the vector in the traveling direction of the subject vehicle at the right/left turn are processed as the same parameter. Therefore, brake control is exerted in response to the preceding vehicle that is making the right/left turn, earlier than the brake timing intended by the driver, and a brake force that is stronger than expected is applied. This makes the driver feel discomfort. Moreover, since there is a tendency for deceleration to be excessive, acceleration driving is delayed after the subject vehicle has passed the preceding vehicle.

For example, Japanese Unexamined Patent Application Publication No. 2000-57499 discloses a technique as a measure against the above-described problems. In this technique, a traveling path and a speed of a preceding vehicle are calculated on the basis of information about the distance between the preceding vehicle and a subject vehicle and information about the lateral position of the preceding vehicle. From the calculation result, a speed vector of the preceding vehicle is calculated. When the speed vector greatly changes in the traveling direction and the vehicle speed greatly changes, it is determined that the preceding vehicle is making a right/left turn.

According to the technique disclosed in this publication, it is possible to recognize a right/left turn of the preceding vehicle early in follow-up running control. When the right/left turn of the preceding vehicle is recognized, smooth running control can be performed without excessive brake control.

Unfortunately, it is difficult for the above-described technique to cope with a case in which the preceding vehicle further decelerates or stops during the right/left turn.

For example, when the preceding vehicle is making a right/left turn and encounters a pedestrian in the turning direction, the driver of the preceding vehicle further reduces the vehicle speed or stops the preceding vehicle, and then waits until the pedestrian has completely crossed the road. In this case, the rear of the preceding vehicle may stay in the traveling lane of the subject vehicle.

In this situation, the driver of the subject vehicle may desire to further decelerate the subject vehicle. However, since control is performed to uniformly reduce the brake force in the above-described technique, it is difficult to meet the driver's desire.

SUMMARY OF THE INVENTION

In light of the above circumstances, it is an object of the present invention to provide a vehicle running control system which can properly set a target inter-vehicle distance when a right/left turn of a preceding vehicle is recognized, and which can achieve running control that meets the driver's desire.

In order to achieve the above object, a vehicle running control system according to an aspect of the present invention includes front-environment recognition means mounted in a subject vehicle, the front-environment recognition means recognizing at least a preceding vehicle; right/left turn judging means for judging a right or left turn of the preceding vehicle on the basis of information about the preceding vehicle recognized by the front-environment recognition means; and target inter-vehicle distance setting means for setting a target inter-vehicle distance between the subject vehicle and the preceding vehicle on the basis of one of a vehicle speed of the preceding vehicle calculated from the information about the preceding vehicle recognized by the front-environment recognition means and a speed of the subject vehicle. The target inter-vehicle distance includes a first target inter-vehicle distance set when the right/left turn judging means determines that the preceding vehicle is making a right or left turn, and a second target inter-vehicle distance set when the preceding vehicle is traveling straight ahead. The first target inter-vehicle distance is shorter than the second target inter-vehicle distance.

According to the present invention, when a right or left turn of the preceding vehicle is detected, the target inter-vehicle distance is set to be shorter than when the preceding vehicle is traveling straight ahead. Hence, an optimal target inter-vehicle distance can be set when the preceding vehicle is making a right or left turn, and running control that meets the driver's desire can be performed.

DESCRIPTION OF THE PREFERRED EMBODIMENTS

Figure 1:
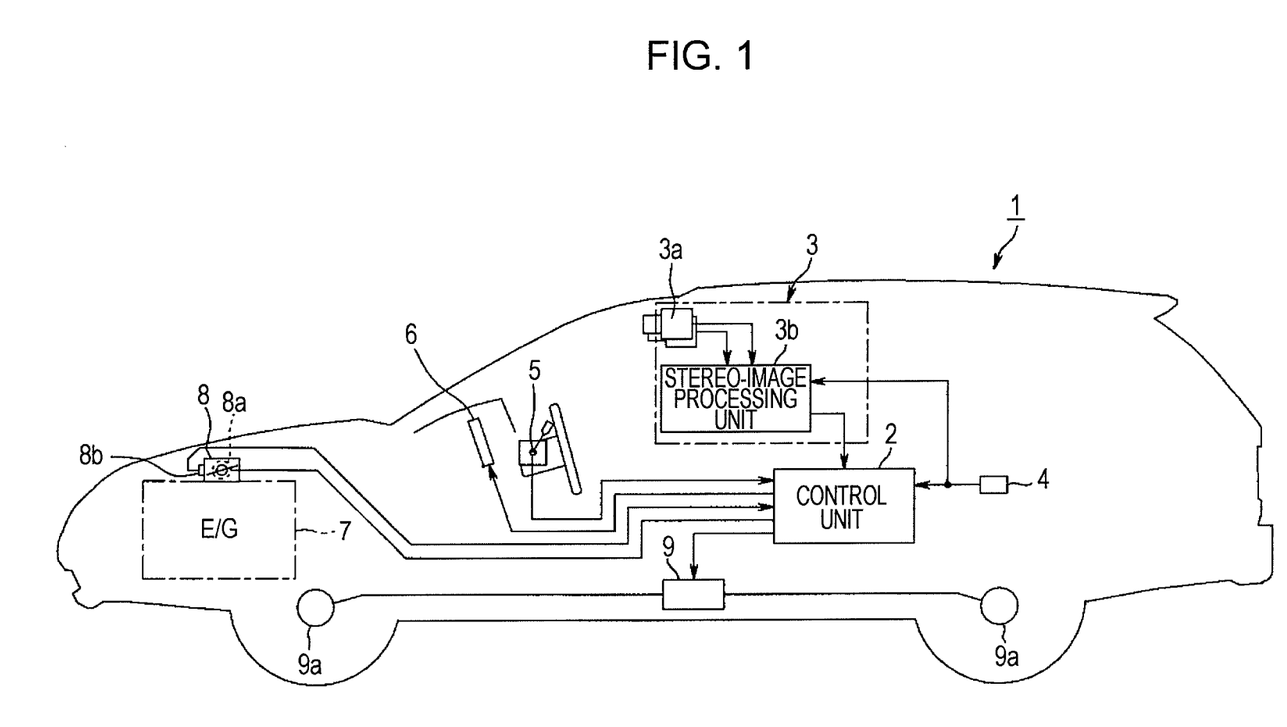
FIG. 1 is a schematic structural view of a vehicle in which a running control system is mounted.

An embodiment of the present invention will be described below with reference to the drawings. FIG. 1 is a schematic structural view of a vehicle in which a running control system is mounted.

Referring to FIG. 1, a subject vehicle, such as a car, 1 includes a control unit 2 that controls the driving state of the subject vehicle 1. The control unit 2 has a function as a running control means. The control unit 2 is mainly formed by a microcomputer including a CPU, a ROM, a RAM, and a nonvolatile memory, such as an EEPROM, which are known. The ROM stores various control programs and fixed data such as a target inter-vehicle table that will be described below. The CPU processes detection signals from sensors and switches according to the control programs stored in the ROM, and performs vehicle running control, such as engine control and brake control, on the basis of the above-described target inter-vehicle table, various data stored in the RAM, and various learning data stored in the nonvolatile memory.

Figure 4A:
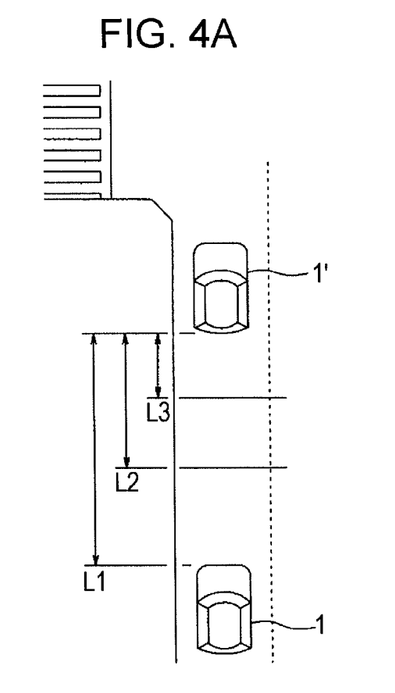
FIG. 4A explains follow-up running control performed when a preceding vehicle is traveling straight ahead, and FIG. 4B explains follow-up running control performed when the preceding vehicle is making a right/left turn.
Figure 4B:
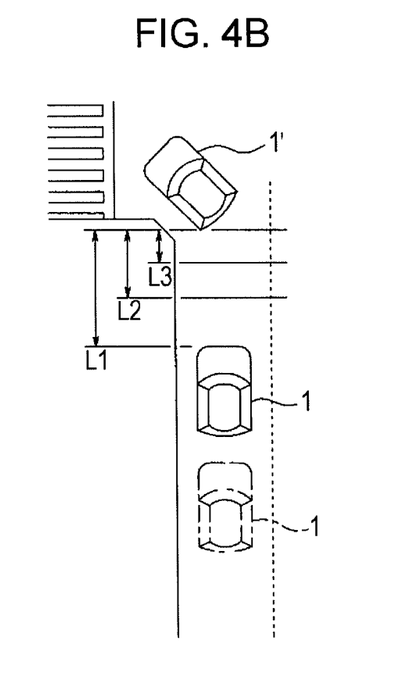

A front-environment recognition device 3, a vehicle-speed sensor 4, a cruise switch 5, and a throttle-opening sensor 8b are connected to an input side of the control unit 2. The front-environment recognition device 3 serves as a front-environment recognition means that detects an environment in front of the subject vehicle 1 and that recognizes at least a preceding vehicle 1' (see FIG. 4) and a traveling lane. The vehicle-speed sensor 4 detects a vehicle speed Vsp (Km/h) of the subject vehicle 1 (subject vehicle speed). The cruise switch 5 starts and stops running control. The throttle-opening sensor 8b detects the opening of a throttle valve. A combination meter 6 in which a speed meter, a rotation meter, etc. are arranged is connected to an output side of the control unit 2. Moreover, a throttle actuator 8a and a brake booster 9 are connected to the output side of the control unit 2. The throttle actuator 8a is provided in an electronic control throttle device 8 mounted in an induction system of an engine 7, and opens and closes the throttle valve. The brake booster 9 forcibly supplies hydraulic brake pressure to brake wheel cylinders 9a attached to the four wheels. When hydraulic brake pressure is supplied from the brake booster 9 to the brake wheel cylinders 9a, the wheels are braked, and the running subject vehicle 1 is forced to decelerate.

The front-environment recognition device 3 includes a stereo camera 3a and a stereo-image processing unit 3b. The stereo camera 3a includes a pair of right and left CCD cameras respectively using solid-state image pickup elements, such as charge coupled devices (CCDs), as stereo optical systems. The CCD cameras are spaced a fixed distance apart on the front of a ceiling in the vehicle interior. The CCD cameras take stereo images of a target object outside the subject vehicle 1 from different viewpoints, and input image data on the stereo images to the stereo-image processing unit 3b.

The stereo-image processing unit 3b obtains distance information from the difference between the corresponding positions in the stereo images of the environment in front of the subject vehicle 1 that are taken by the right and left CCD cameras of the stereo camera 3a, and generates a distance image on the basis of the distance information. According to data on the distance image, the stereo-image processing unit 3b recognizes the preceding vehicle 1' and so on. Also, the stereo-image processing unit 3b finds a relative distance (inter-vehicle distance) between the subject vehicle 1 and the preceding vehicle 1', and outputs data on the recognized preceding vehicle 1' and so on to the control unit 2.

The control unit 2 has a function of exerting ACC (Adaptive Cruise Control: inter-vehicle distance control) for maintaining a proper inter-vehicle distance between the subject vehicle 1 and the preceding vehicle 1'. ACC maintains a proper inter-vehicle distance between the subject vehicle 1 and the preceding vehicle 1' on the basis of information about the preceding vehicle 1' recognized by the stereo-image processing unit 3b and the subject vehicle speed Vsp detected by the vehicle-speed sensor 4. This ACC is started by turning on the cruise switch 5.

In other words, when the cruise switch 5 is turned on, the control unit 2 reads information about the preceding vehicle 1' recognized by the stereo-image processing unit 3b, and determines whether or not the preceding vehicle 1' is traveling in a traveling lane in front of the subject vehicle 1. When the preceding vehicle 1' is not detected, constant-speed running control is performed to keep the speed Vsp of the subject vehicle 1 at a set vehicle speed set by the driver. In contrast, when the preceding vehicle 1' is detected and the vehicle speed of the preceding vehicle 1' is less than or equal to the set vehicle speed, follow-up running control is performed to follow the preceding vehicle 1' while maintaining a predetermined inter-vehicle distance between the subject vehicle 1 and the preceding vehicle 1'.

In constant-speed running control, the set vehicle speed is set as a target vehicle speed Vtg, and the throttle actuator 8a provided in the electronic control throttle device 8 is operated to open and close the throttle valve so that the subject vehicle speed Vsp is kept at the target vehicle speed Vtg. In follow-up running control, a target inter-vehicle distance is set on the basis of the vehicle speed of the preceding vehicle 1', a target vehicle speed Vtg for maintaining the target inter-vehicle distance is set, and opening and closing of the throttle valve are controlled so that the subject vehicle speed Vsp equals the target vehicle speed Vtg. In a case in which the inter-vehicle distance between the subject vehicle 1 and the preceding vehicle 1' becomes shorter than the target inter-vehicle distance and cannot be returned to the target inter-vehicle distance only by engine brake as a result of speed reduction of the preceding vehicle 1', for example, by braking, the brake booster 9 is operated to supply hydraulic brake pressure to the brake wheel cylinders 9a attached to the four wheels, thereby forcibly braking the wheels and reducing the speed. Further, when a right/left turn of the preceding vehicle 1' is detected during follow-up running control, the above-described target inter-vehicle distance is set at a small value, and the speed reduction time is delayed, compared with normal follow-up running control. This allows control according to the feeling of the driver.

When it is detected that the preceding vehicle 1' has moved out during follow-up running control, the follow-up running control is switched to constant-speed running control in ACC, and transient control is performed to increase the subject vehicle speed Vsp to the set vehicle speed in accordance with a preset acceleration.

Figure 2:
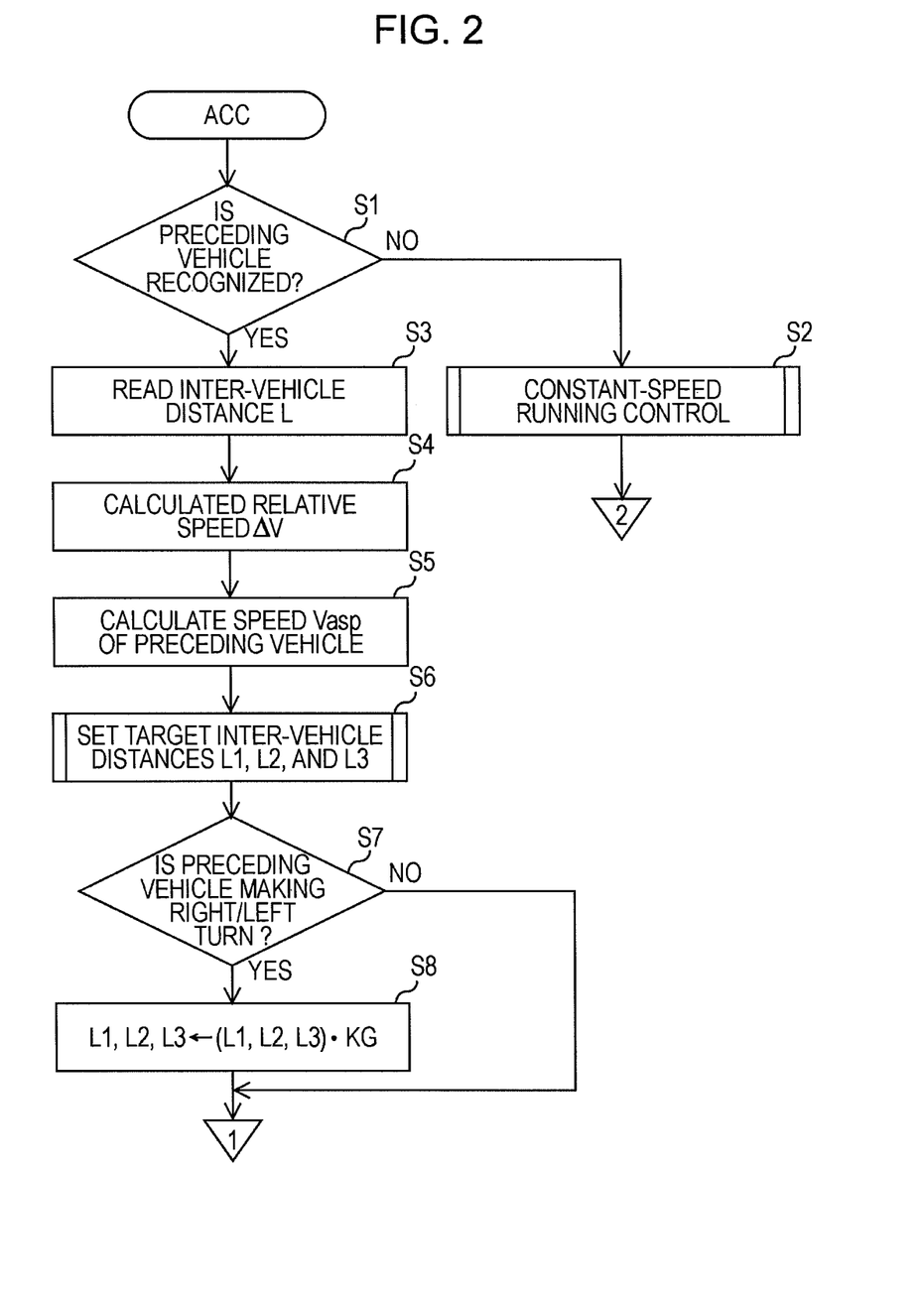
FIG. 2 is a first flowchart showing an ACC routine.
Figure 3:
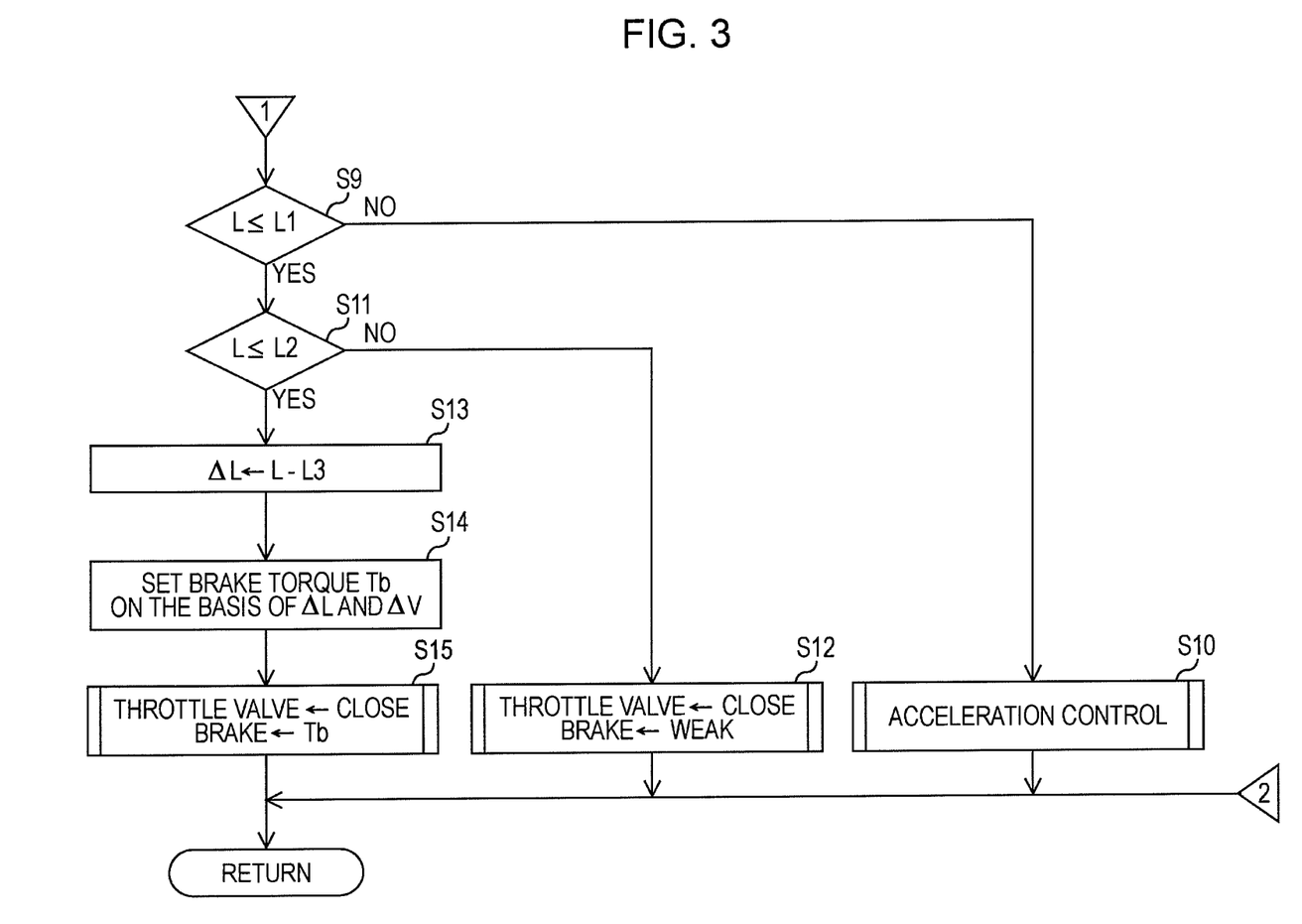
FIG. 3 is a second flowchart showing the ACC routine.

More specifically, ACC is performed by the control unit 2 according to an ACC routine shown in FIGS. 2 and 3.

This routine is performed in every setting operation cycle after the driver turns on an ignition switch and then turns on the cruise switch 5. First, in Step S1, the stereo-image processing unit 3b determines whether or not a preceding vehicle 1' (see FIG. 4) traveling in a traveling lane in front of a subject vehicle 1 is recognized. When the preceding vehicle 1' is not recognized, constant-speed running control is performed in Step S2, and the routine is exited. Here, constant-speed running control will be described briefly. In constant-speed running control, a vehicle speed set by the driver (set vehicle speed) is set as a target vehicle speed, and feedback control is exerted on the opening of the throttle valve provided in the electronic control throttle device 8 so that the subject vehicle speed Vsp converges to the target vehicle speed.

When it is determined that the preceding vehicle 1' is recognized, an inter-vehicle distance L between the subject vehicle 1 and the preceding vehicle 1', which is recognized by the stereo-image processing unit 3b, is read in Step S3. Then, in Step S4, a relative speed ΔV between the subject vehicle 1 and the preceding vehicle 1' is calculated on the basis of the change in the inter-vehicle distance L.

Next, in Step S5, a vehicle speed (preceding vehicle speed) Vasp of the preceding vehicle 1' is calculated on the basis of a subject vehicle speed Vsp detected by the vehicle-speed sensor 4 and the relative speed ΔV. In Step S6, a target inter-vehicle table is searched with interpolation on the basis of the preceding vehicle speed Vasp, and three target inter-vehicle distances L1, L2, and L3 are set. These target inter-vehicle distances L1, L2, and L3 have a relationship that satisfies the condition that L1>L2>L3. Operations in this Step S6 and Step S8, which will be described below, correspond to the target inter-vehicle distance setting means in the present invention.

The target inter-vehicle distance L1 allows the subject vehicle 1 to follow the preceding vehicle 1' while maintaining a safe distance to the preceding vehicle 1'. Usually, the subject vehicle speed Vsp is controlled so that the inter-vehicle distance L is kept at the target inter-vehicle distance L1. Hereinafter, the target inter-vehicle distance L1 is referred to as a follow-up target inter-vehicle distance L1.

The target inter-vehicle distance L2 is a threshold value above which the subject vehicle speed Vsp is reduced by brake control using a small brake torque. When the inter-vehicle distance L is between the target inter-vehicle distance L1 and the target inter-vehicle distance L2, it is forcibly returned to the target inter-vehicle distance L1 by decelerating the subject vehicle 1. The subject vehicle 1 is decelerated by fully closing the throttle valve to use the engine brake and performing brake control with a low brake torque. Hereinafter, the target inter-vehicle distance L2 is referred to as a brake target inter-vehicle distance L2.

Figure 5:
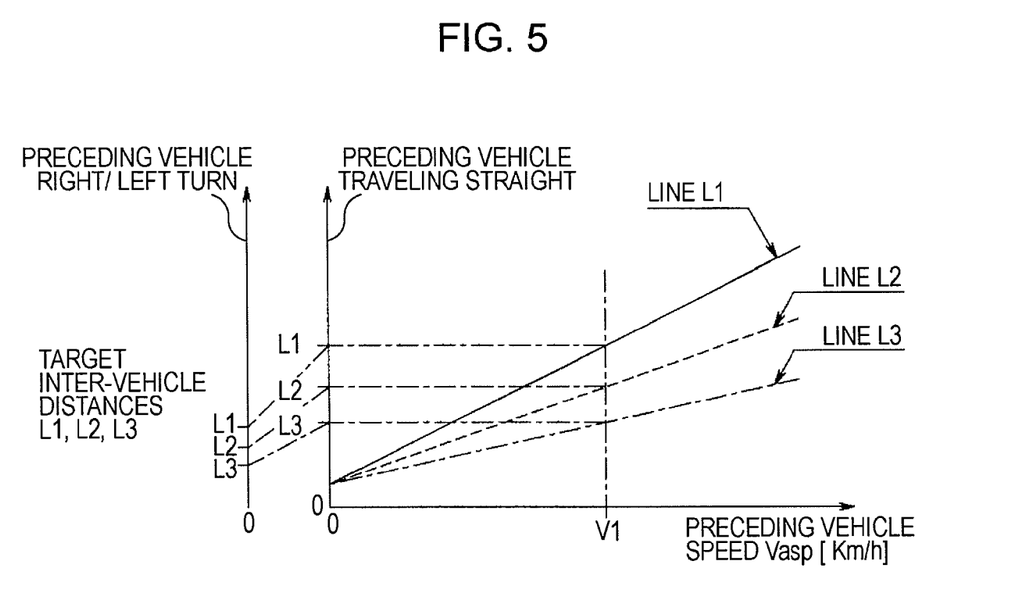
FIG. 5 is a conceptual view showing a target inter-vehicle table.

The target inter-vehicle distance L3 is used to finally reduce the speed of the subject vehicle 1 to the speed of the preceding vehicle 1' or to stop the subject vehicle 1. When the inter-vehicle distance L is between the brake target inter-vehicle distance L2 and the target inter-vehicle distance L3, the subject vehicle 1 is decelerated by fully closing the throttle valve to use the engine brake and performing brake control with a high brake torque, and is finally stopped at the target inter-vehicle distance L3 to the preceding vehicle 1'. Hereinafter, the target inter-vehicle distance L3 is referred to as a final brake target inter-vehicle distance L3. The target inter-vehicle distances L1, L2, and L3 are found beforehand by experiment or by other methods corresponding to the preceding vehicle speed Vasp, and are stored in the target inter-vehicle table. The characteristics of the target inter-vehicle distances L1, L2, and L3 stored in the target inter-vehicle table are specifically shown by a follow-up target inter-vehicle distance (L1) line, a brake target inter-vehicle distance (L2) line, and a final brake target inter-vehicle distance (L3) line, as shown in FIG. 5.

Figure 6:
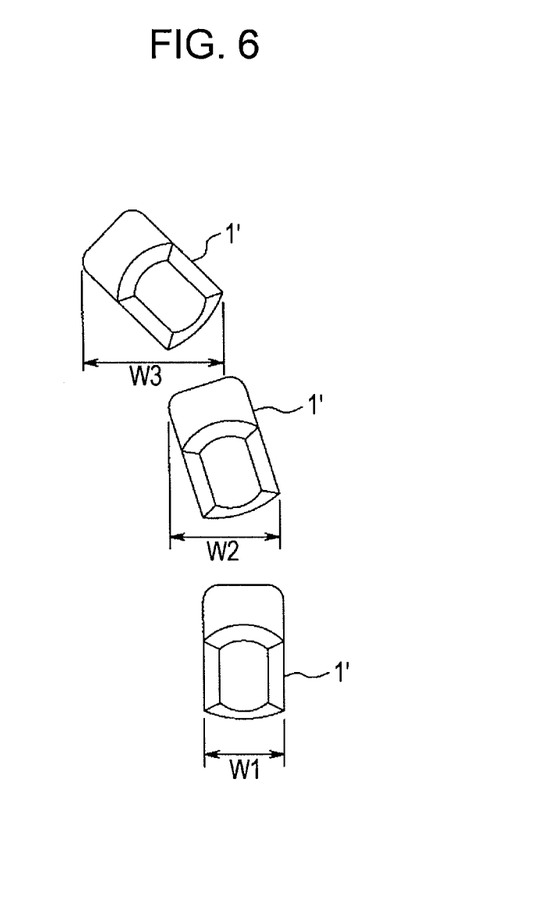
FIG. 6 explains changes in width of an image of the vehicle captured by a stereo camera during a right/left turn.

Next, in Step S7, it is checked whether the preceding vehicle 1' is making a right/left turn. A right/left turn of the preceding vehicle 1' is checked on the basis of the preceding vehicle information recognized by the stereo-image processing unit 3b. In other words, as shown in FIG. 6, when the preceding vehicle 1' is making a right/left turn (FIG. 6 shows a state in which the preceding vehicle 1' is turning to the left), for example, at an intersection, the width of an image of the preceding vehicle 1' taken by the stereo camera 3a gradually increases from W1, which is the width provided when the preceding vehicle 1' is traveling straight ahead, to W2 and to W3 as the preceding vehicle 1' continues to turn to the left. The control unit 2 continuously measures changes in the width of the image of the preceding vehicle 1' on the basis of the preceding vehicle information recognized by the stereo-image processing unit 3b, and thereby determines whether or not the preceding vehicle 1' is making a right/left turn. When it is determined that the preceding vehicle 1' is making a right/left turn, Step S8 is performed. Further, when it is determined that the preceding vehicle 1' is traveling straight ahead, the routine jumps to Step S9. The operation in Step S7 corresponds to the right/left turn judging means in the present invention.

In Step S8, target inter-vehicle distances L1, L2, and L3 at a right/left turn are set by multiplying the target inter-vehicle distances L1, L2, and L3, which are set in Step S6, by a correction coefficient KG (KG<1) ((L1, L2, L3)·KG), and then, the routine proceeds to Step S9. In this embodiment, the correction coefficient KG is set at 0.5. Hence, when the preceding vehicle 1' is traveling at a speed V1, as shown in FIG. 5, the inter-vehicle distances L1, L2, and L3 during a right/left turn are half the distances during straight traveling.

While the correction coefficient KG is a fixed value in this embodiment, it may be a variable value. More specifically, a time taken until the inter-vehicle distance L becomes 0 is estimated, and the correction coefficient KG is set to increase (the correction amount decreases) as the sum of the estimated time and an allowance time decreases. Alternatively, a relative moving speed in the lateral direction between the preceding vehicle 1' and the subject vehicle 1 is found, a time taken until the preceding vehicle 1' moves out of the traveling lane in front of the subject vehicle 1 is estimated from the relative moving speed, and the correction coefficient KG is set to increase as the estimated time increases. Still alternatively, the width of the subject vehicle 1 and a lap ratio in the lateral direction of the preceding vehicle 1' with respect to the width are calculated, and a time taken until the lap ratio becomes 0 is estimated. The correction coefficient KG is set to increase as the estimated time increases.

As a result, the target inter-vehicle distances L1, L2, and L3 are set to be shorter when the preceding vehicle 1' is making a right/left turn than when the preceding vehicle 1' is traveling straight ahead, as shown in FIG. 5. Therefore, brake control is not performed until the subject vehicle 1 comes very close to the preceding vehicle 1'. When the subject vehicle 1 comes very close to the preceding vehicle 1', it is stopped at the final brake target inter-vehicle distance L3 by a strong brake force.

For this reason, when the preceding vehicle 1' is traveling straight ahead, as shown in FIG. 4A, normal target inter-vehicle distances L1, L2, and L3 are set until immediately before a right/left turn is detected. When it is judged that the preceding vehicle 1' is making a right/left turn, as shown in FIG. 4B, the target inter-vehicle distances L1, L2, and L3 are shortened by the amount of correction with the correction coefficient KG. Since the target inter-vehicle distances L1, L2, and L3 are shortened when the control unit 2 detects a right/left turn of the preceding vehicle 1', for example, when a right/left turn of the preceding vehicle 1' is detected while follow-up running control is performed so that the subject vehicle 1 follows the preceding vehicle 1' traveling straight ahead at the follow-up target inter-vehicle distance L1, the follow-up target inter-vehicle distance L1 is shortened. Hence, running control is temporarily switched to constant-speed running control, and the inter-vehicle distance is shortened.

After that, when the subject vehicle 1 moves close to the preceding vehicle 1' so that the inter-vehicle distance therebetween equals the follow-up target inter-vehicle distance L1 at a right/left turn, running control is switched to follow-up running control again. The target inter-vehicle distances L1, L2, and L3 for the right/left turn may be set by searching the table with interpolation on the basis of the preceding vehicle speed Vasp.

In Step S9, the inter-vehicle distance L between the subject vehicle 1 and the preceding vehicle 1' is compared with the follow-up target inter-vehicle distance L1. When the inter-vehicle distance L is more than the follow-up target inter-vehicle distance L1, since the inter-vehicle distance L deviates from the follow-up target inter-vehicle distance L1, acceleration control is performed in Step S10 so that the inter-vehicle distance L becomes equal to the follow-up target inter-vehicle distance L1, and the routine is exited. The target vehicle speed during acceleration control does, of course, not exceed the set vehicle speed.

When the target inter-vehicle distance L is less than or equal to the follow-up target inter-vehicle distance L1, it is compared with the brake target inter-vehicle distance L2 in Step S11. When L>L2, that is, L1≥L>L2, the routine branches to Step S12. In Step S12, a signal to fully close the throttle valve is output to the throttle actuator 8a in the electronic control throttle device 8 so as to use the engine brake. Moreover, a brake torque signal is output to the brake booster 9 in order to perform soft braking and deceleration so that the inter-vehicle distance L returns to the follow-up target inter-vehicle distance L1. Then, the routine is exited.

When L≤L2, a relative distance ΔL is calculated based on a difference between the inter-vehicle distance L and the final brake target inter-vehicle distance L3 in Step S13. Then, in Step S14, a brake torque Tb is set, for example, by map search on the basis of the relative distance ΔL and the relative speed ΔV. The brake torque Tb is set to increase as the relative distance ΔL decreases and the relative speed ΔV increases, and conversely, to decrease as the relative distance ΔL increases and the relative speed ΔV decreases.

Subsequently, in Step S15, a signal to fully close the throttle valve is output to the throttle actuator 8a in the electronic control throttle device 8 so as to use the engine brake. Moreover, a brake torque signal corresponding to the brake torque Tb is output to the brake booster 9. By this brake torque signal, a brake torque is produced in the brake wheel cylinders 9a via the brake booster 9, and rapid deceleration is performed. Then, the routine is exited.

In this way, in this embodiment, the target inter-vehicle distances L1, L2, and L3 are set to be shorter when the preceding vehicle 1' is making a right/left turn than when the preceding vehicle 1' is traveling straight ahead. Therefore, when the control unit 2 detects a right/left turn of the preceding vehicle 1', as shown in FIG. 4B, constant-speed running control is performed until the inter-vehicle distance between the subject vehicle 1 and the preceding vehicle 1' becomes close to the follow-up target inter-vehicle distance L1 at a right/left turn. In this case, the driver estimates the time at which the preceding vehicle 1' will move out of the traveling lane in front of the subject vehicle 1 because of the right/left turn. When a width through which the subject vehicle 1 can pass is ensured between the rear of the preceding vehicle 1' and the center line before the preceding vehicle 1' completely moves out of the traveling lane, the driver changes the lane of the subject vehicle 1 by turning the steering wheel, and passes the preceding vehicle 1'. Then, constant-speed running control can be continued.

For example, when a width through which the subject vehicle 1 can pass is not ensured between the rear of the preceding vehicle 1' and the center line because the preceding vehicle 1' encounters a pedestrian crossing the road and stops during a right/left turn, the subject vehicle speed Vsp is controlled in accordance with the target inter-vehicle distances L1, L2, and L3 at the right/left turn. This allows the subject vehicle 1 to be stopped safely.

As a result, when the control unit 2 detects the right/left turn of the preceding vehicle 1', brake control can be performed properly. Further, when the width through which the subject vehicle 1 can pass is ensured between the rear of the preceding vehicle 1' and the center line, constant-speed running control can be continued. Hence, it is possible to perform running control that meets the driver's desire.

The present invention is not limited to the above-described embodiment. For example, the present invention is also applicable to a case in which only the follow-up target inter-vehicle distance L1 is adopted as the target inter-vehicle distance.

What is claimed is:
1. A vehicle running control system comprising:
front-environment recognition means mounted in a subject vehicle, the front-environment recognition means recognizing at least a preceding vehicle, and an inter-vehicle distance between the preceding vehicle and the subject vehicle;
right/left turn judging means for judging a right or left turn of the preceding vehicle on the basis of information about the preceding vehicle recognized by the front-environment recognition means; and target inter-vehicle distance setting means for setting a target inter-vehicle distance between the subject vehicle and the preceding vehicle on the basis of one of a vehicle speed of the preceding vehicle calculated from the information about the preceding vehicle recognized by the front-environment recognition means and a speed of the subject vehicle, wherein the target inter-vehicle distance is a target distance established for comparison with the recognized inter-vehicle distance, the target inter-vehicle distance includes a first target inter-vehicle distance set when the right/left turn judging means determines that the preceding vehicle is making a right or left turn, and a second target inter-vehicle distance set when the preceding vehicle is traveling straight ahead, and the first target inter-vehicle distance is shorter than the second target inter-vehicle distance.

2. The vehicle running control system according to claim 1, wherein, when the right/left turn judging means determines that the preceding vehicle is making the right or left turn, the target inter-vehicle distance setting means sets the first target inter-vehicle distance by correcting the second target inter-vehicle distance.

3. The vehicle running control system according to claim 2, wherein
   a time taken until an inter-vehicle distance between the preceding vehicle and the subject vehicle becomes zero is estimated based on the recognized inter-vehicle distance,
   a correction value for correcting the second target inter-vehicle distance is set on the basis of the sum of the estimated time and an allowance time, and
   the first target inter-vehicle distance is set by multiplying the second target inter-vehicle distance by the correction value.

4. The vehicle running control system according to claim 2, wherein a time taken until the preceding vehicle moves out of a traveling lane in front of the subject vehicle is estimated, and a correction value for correcting the second target inter-vehicle distance is set on the basis of the estimated time.

5. The vehicle running control system according to claim 2, wherein a width of the subject vehicle and a lap ratio in a lateral direction of the preceding vehicle with respect to the width of the subject vehicle are calculated, a time taken until the lap ratio becomes zero is estimated, and a correction value for correcting the second target inter-vehicle distance is set on the basis of the estimated time.

* * * * *